United States Patent [19]

Amoroso

[11] Patent Number: 5,155,454

[45] Date of Patent: Oct. 13, 1992

[54] MSK MODULATOR USING A VCO TO PRODUCE MSK SIGNALS

[75] Inventor: Frank Amoroso, Santa Ana, Calif.

[73] Assignee: Hughes Aircraft Company, Los Angeles, Calif.

[21] Appl. No.: 659,591

[22] Filed: Feb. 20, 1991

[51] Int. Cl.[5] .................................... H04L 27/12
[52] U.S. Cl. ..................................... 332/100; 375/47; 375/64; 375/65
[58] Field of Search .................... 332/100, 101, 102; 375/47, 64, 65,

[56] References Cited

U.S. PATENT DOCUMENTS 3,731,233  5/1973  Hutchinson .................. 332/101

OTHER PUBLICATIONS

F. Amoroso and J. A. Kivett, "Simplified MSK signalling technique," IEEE Transactions on Communications, vol. COM-25, No. 4, pp. 433-441, Apr. 1977.

F. Amoroso, "Loss of SNR in low pass filtered FM/MSK," IEEE MILCOM '86, paper 40.2, Monterey, CA, Oct. 5-9, 1986.

Primary Examiner—Siegfried H. Grimm
Attorney, Agent, or Firm—Wanda K. Denson-Low

[57] ABSTRACT

A Minimum-Shift Keying (MSK) modulator is described, wherein a feedback scheme is used in combination with a precise frequency reference to enable the production of MSK modulation at the output of an off-the-shelf voltage controlled oscillator (VCO). The upper and lower drive voltages for the VCO, corresponding to the upper and lower frequencies characteristic of MSK, are individually and independently corrected to compensate for imprecisions or fluctuations in the VCO characteristics. The correction increments are derived from phase excursion measurements over individual keying intervals.

11 Claims, 1 Drawing Sheet

MSK MODULATOR USING A VCO TO PRODUCE MSK SIGNALS

BACKGROUND OF THE INVENTION

The present invention relates to minimum-shift keying (MSK) modulators, and more particularly to a technique for producing MSK modulation at the output of a voltage-controlled oscillator ("VCO").

Previous circuits for the production of MSK have relied on synthesizing the in-phase and quadrature signals independently, or on Surface Acoustic Wave (SAW) filters that typically require subsequent up-conversion (or down conversion) to the radio frequency (RF) carrier of interest. An exemplary circuit is described in F. Amoroso and J. A. Kivett, "Simplified MSK signaling technique," IEEE Transactions on Communications, Vol. COM-25, No. 4, pp. 433-441, April 1977.

It is an object of the invention to produce MSK modulation using a VCO output directly at the required RF carrier.

A further object of the invention is to provide a modulator circuit employing a VCO capable of producing modified MSK modulation at the VCO output as the result of low pass filtering prior to the VCO to reduce power spectral sidelobes in the VCO signal. Exemplary low pass filtering and spectral sidelobe reduction are shown in F. Amoroso, "Loss of SNR in low pass filtered FM/MSK," IEEE MILCOM '86, paper 40.2, Monterey, CA, Oct. 5-9, 1986.

SUMMARY OF THE INVENTION

In accordance with the invention, a Minimum-Shift Keying (MSK) modulator receiving a key signal stream whose values determine whether a first or second signal frequency is generated by the modulator is described. The modulator includes a voltage controlled oscillator (VCO) which is driven by a first or second drive voltage source in dependence on the value of the key signal stream. The modulator is characterized in that the first and second drive voltages are individually and independently corrected to compensate for imprecisions and fluctuations in the VCO characteristics. The corrections are derived from phase excursion measurements over individual keying intervals.

BRIEF DESCRIPTION OF THE DRAWING

These and other features and advantages of the present invention will become more apparent from the following detailed description of an exemplary embodiment thereof, as illustrated in the accompanying drawing, in which.

DETAILED DESCRIPTION OF THE PREFERRED EMBODIMENT

Figure 1:
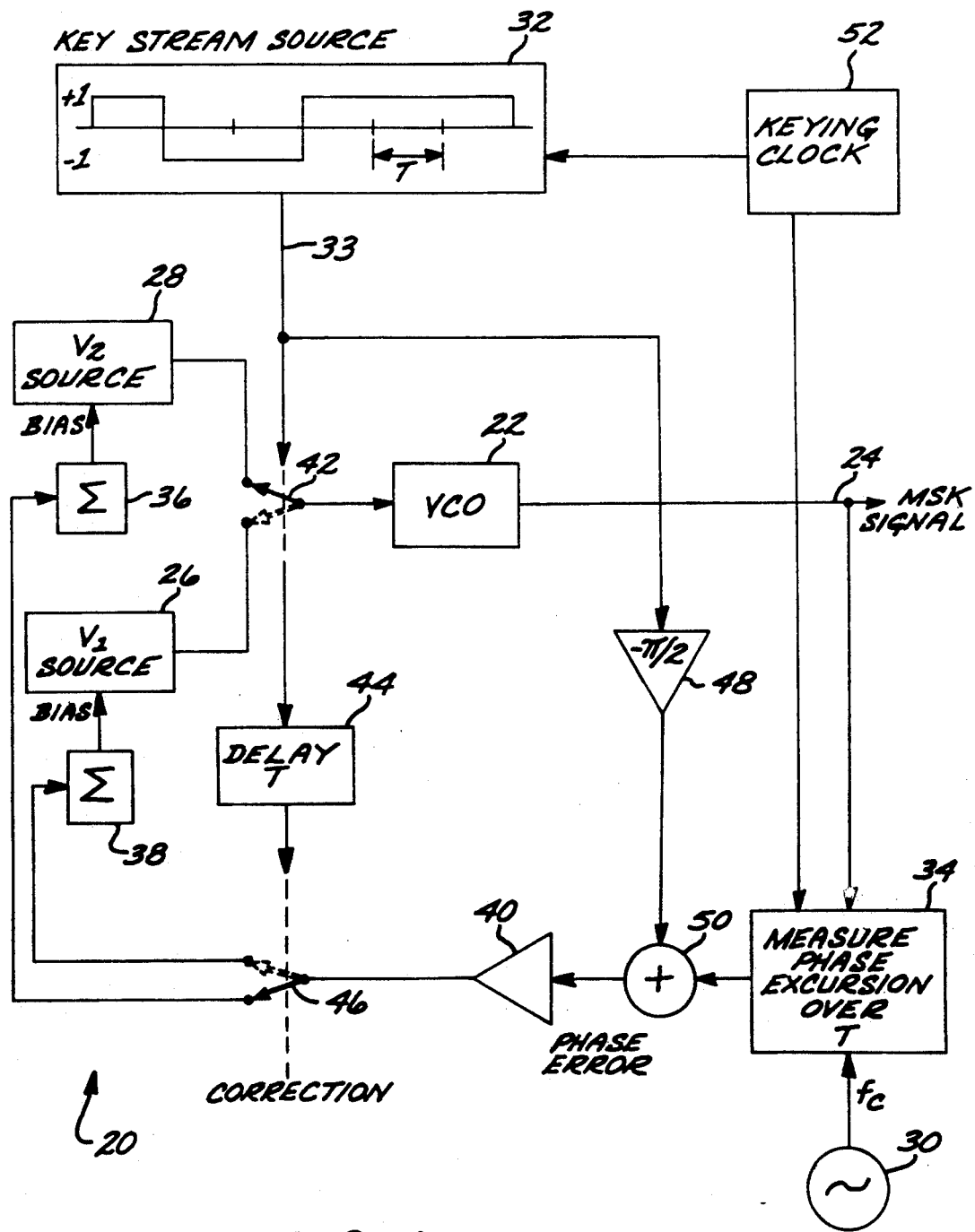
FIG. 1 is a simplified block diagram of an MSK modulator circuit embodying the invention.

Referring to FIG. 1, a minimum-shift keyed modulator 20 embodying the present invention is disclosed, wherein the output 24 of an off-the-shelf voltage controlled oscillator (VCO) 22 is a minimum-shift keyed (MSK) data signal with keying interval T. According to prevailing definitions as set forth in F. Amoroso and J.A. Kivett, "Simplified MSK signal technique," IEEE Transaction on Communications, Vol. COM-25, No. 4, pp. 433-441, April 1977, MSK is a form of continuous phase Frequency Shift Keying (FSK) with modulation index 0.5 as defined by $$(f_2 - f_1)T = 0.5 \tag{1}$$

where $f_2$ and $f_1$ are the upper and lower keying frequencies, respectively. That definition governs the present invention. The output of the VCO 22 will, indeed, be a MSK signal if the corresponding pair of VCO drive voltages from voltage drive sources 26 and 28 leads to the relationship of eq. 1.

Typically, the center frequency and the sensitivity of an off-the-shelf VCO are only approximately known, so that the drive voltages $V_2$ and $V_1$ for a particular VCO which correspond precisely to the required $f_2$ and $f_1$ are not generally known in advance. But in practice it is required that $V_2$ and $V_1$ be so set that the center frequency, halfway between $f_2$ and $f_1$, is equal precisely to a locally supplied reference, shown as $f_c$ generated by reference generator 30 in FIG. 1. Further, it is required that the difference between $f_2$ and $f_1$ be precisely (0.5/T) as implied by eq. 1.

For the purposes of the present invention the requirements of the above paragraph are re-cast in the following equivalent form:

$$f_2 - f_c = (0.25/T) \tag{a}$$
$$f_c - f_1 = (0.25/T) \tag{b}$$
(2)

The circuit 20 is controlled by a key stream from source 32, which has values of either +1 or −1. The particular value of the bit stream at any given time instant will determine whether a frequency $f_1$ or $f_2$ is called for. The source 32 is clocked by the keying clock 52. The key stream controls a switch 42 which selects as the VCO drive either the output of source 26 or 28, depending on the value of the key stream signal 33. The key stream signal is passed through delay device 44, which after a delay of T seconds controls the switch 46 to connect the feedback loop output correction value either to accumulator 36 or accumulator 38. The keying clock 52 also clocks the phase comparator 34, described in further detail below.

As shown in FIG. 1, the keying stream signal 33 also serves as the input to amplifier 48, which multiplies the value of the keying stream signal (+1 or −1) by $-\pi/2$. Thus, the amplifier output will be a scalar value $-\pi/2$ when the signal 33 has the value +1, and a scalar value $+\pi/2$ when the signal 33 has the value −1.

The amplifier 48 serves to maintain the proper sense of the negative feedback loop comprising the VCO 22, the phase comparator 34, the summing node 50, the loop gain represented by amplifier 40 and the voltage sources 28 and 26. This is so because the nominal phase excursion of the VCO output signal over the keying interval is either $+\pi/2$ or $-\pi/2$, depending on whether the upper or lower frequency is being generated, corresponding to either the +1 or −1 value of the keying stream signal 33. Thus, assuming the correct phase excursion over a keying interval is measured by the phase comparator 34, the output of the summing node 50 will be zero, since the output of the comparator 34 will have been exactly offset by the output of the amplifier 48. If there is not a correct phase excursion, the output of the summing node 50 will be a scalar value representative of the phase error over the keying interval. This error signal is amplified by the loop gain 40, and the resultant signal is passed through the switch 46 to either the accumulator 36 or 38.

In an actual implementation, the phase error signal will likely be digitized, so that the devices 36 and 38 can be implemented as digital accumulators, such as digital up/down counters of the required precision. During the operation of the circuit, the phase error signals will be accumulated in the proper device 36 or 38, and the accumulated error signals used to control the particular source voltage generated by source 28 and 26, respectively. In such a digital implementation, the voltage source devices 26 and 28 can comprise digital-to-analog converter devices for converting the digital accumulator values of accumulators 36 and 38 into voltages $V_2$ and $V_1$. In this case, the start values of the up/down counters comprising devices 36 and 38 can be set to the nominal values for the voltages corresponding to frequencies $f_1$ and $f_2$.

Principle of Operation

In a purely static, noise-free condition, in which the gain and sensitivity of the VCO 22 are not changing, eq. 2 can be satisfied perfectly by the feedback system shown in FIG. 1. To understand this, name the drive voltages $V_1$ and $V_2$ leading precisely to eq. 2 as $V_{01}$ and $V_{02}$, respectively. At the outset of any practical test the drive voltages provided to the VCO 22 in response to the key stream produced by the key stream source 32 will generally be in error, and are represented here by $V_{01}+\delta_1$ and $V_{02}+\delta_2$, respectively, where $\delta_1$ and $\delta_2$ are the respective drive voltage errors.

Assume that during the very first keying interval the frequency $f_2$ is called for. Instead, as a result of the drive voltage errors for the particular VCO, a different frequency, $f_2+\Delta f_2$, will be produced. This will lead to a phase excursion, measured with respect to $f_c$, of $2\pi(f_2+\Delta f_2-f_c)T$, over the first keying interval. From eq. 2a, it is determined that phase excursion is more simply represented as $(\pi/2)+2\pi\Delta f_2 T$. But, as implied by eq. 2a, and as is well known in the art, the required phase excursion is just $(\pi/2)$ over the keying interval. The phase excursion error, $2\pi\Delta f_2 T$, is measured directly in the circuit of FIG. by means of a phase comparison circuit 34 which carries out a phase comparison, with respect to $f_c$, between the respective VCO outputs at the start and end of the first keying interval.

At the end of that phase comparison, the circuit 20 feeds back a differential corrector voltage to adjust $V_2$. The corrector voltage could, in principle, effect a nearly perfect correction of $V_2$, the accuracy of that correction being limited only by the imprecision of the advance knowledge of the sensitivity of the VCO. Evidently, the frequency error due to the drive voltage error $\delta_2$ could be virtually eliminated at the end of the first keying interval. This corrector voltage is accumulated in the device 36.

Similarly, in the first or any keying interval that calls for $f_1$ and therefore $V_1$, the error $\delta_1$ can be virtually eliminated at the end of that keying interval. In this case, the corrector voltage is accumulated in the device 38.

Obviously, if the circuit 30 were allowed to continue operating on a key stream that offered frequent occurrences of both binary values of the stream, the circuit 20 would soon reduce the frequency errors to any arbitrarily specified small value. In any practical situation the MSK signal would be received by a phase tracking receiver, so that absolutely perfect adherence to eq. 2 would not be required.

In practice, the degree to which the sensed phase error per keying interval is translated into a corrector voltage is governed by the common (and necessarily negative) gain K represented by amplifier 40 of the feedback system in FIG. 1. As is well known in the art of feedback systems, the setting of the gain K is in effect a control on the loop bandwidth of the feedback system. In any specific application, the optimum loop bandwidth depends on a combination of factors, including but not necessarily limited to:

1. The amplitude and spectral characteristics of the VCO internal noise.
2. Characteristics of the VCO physical environment which could cause frequency drift.
3. The statistical characteristics of the key stream, such as its possible randomness or lack of it, or the expectation of long uninterrupted strings of either binary value of the key stream.
4. The need to attain loop stability in the face of time delays necessary to execute the phase excursion measurement.

The setting of optimum value for K can be determined in accordance with the well-established art of feedback system theory and/or simulation.

If the supplied frequency reference were intended to correspond either to $f_1$ or to $f_2$, or to some other frequency whose relationship to $f_1$ and $f_2$ were clearly defined then corresponding required changes in the circuit of FIG. 1 would occur readily to anyone skilled in the art.

If low pass filtering were introduced immediately prior to the VCO, for example, to reduce the power spectral sidelobes at the VCO output, then the circuit of FIG. 1 would still work even though the expected phase excursions over each keying interval were no longer expected to be exactly $\pm\pi/2$. As long as the key stream were random or sufficiently pseudorandom and the loop gain were low enough, the circuit would average out the departures from precise $\pm\pi/2$ phase excursions and still produce the correct values of $V_2$ and $V_1$.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A Minimum-Shift Keying (MSK) modulator receiving a binary-valued key signal stream characterized by a keying interval T and whose values determine whether a first or second signal frequency is generated by said modulator, and comprising a voltage controlled oscillator (VCO) selectively driven by either a first or second drive voltage in dependence on the value of the key signal in a particular keying interval, the VCO output comprising the modulator output signal, said molecular characterized in that (a) said first and second drive voltages, corresponding to the first and second frequencies, are corrected to compensate for variations and fluctuations in the VCO characteristics, said corrections being derived from phase excursion measurements of said VCO output signal over individual keying intervals, said modulator including a feedback means comprising:

(b) a phase comparator responsive to a keying clock for measuring the phase excursion of said VCO output signal over said keying interval T with respect to a reference signal;

(c) means for deriving a phase error signal from the difference between the measured phase excursion over said keying interval T and the ideal phase excursion over said interval; and (d) means for correcting said respective first and second drive voltages in response to said phase error signal.

2. The modulator of claim 1 wherein said binary-valued key signal stream has a value of $+1$ or $-1$, and said means for deriving a phase error signal comprises means for providing a value of $-\pi/2$ or $+\pi/2$ for respective values of $+1$ and $-1$ of said key signal, and for adding said value of $-\pi/2$ or $\pi/2$ to said measured phase excursion value at the end of a particular key interval.

3. The modulator of claim 1 wherein said feedback means further comprises first and second accumulator circuits for accumulating said phase error signals respectively attributable to operation of the modulator at said respective first or second signal frequencies over time, whereby the correction applied to the respective drive voltages is based on an accumulation of said phase error signals over a plurality of key intervals.

4. A Minimum-Shift Keying (MSK) modulator receiving a binary-valued key signal stream characterized by a keying interval T and whose values determine whether a first or second signal frequency is generated by said modulator, and comprising a voltage controlled oscillator (VCO) selectively driven by either a first or second drive voltage in dependence on the value of the key signal in a particular keying interval, the VCO output comprising the modulator output signal, said molecular characterized in that (a) the first and second drive voltages of said respective voltage sources, corresponding to the first and second frequencies, are individually and independently corrected to compensate for imperfections and fluctuations in the VCO characteristics, said corrections being derived from phase excursion measurements of said VCO output signal over individual keying intervals, said modulator including a feedback means comprising:

(b) a phase comparator responsive to a keying clock for measuring the phase excursion of said VCO output signal over said keying interval T with respect to a reference signal;

(c) means for deriving a phase error signal from a signal representative of said measured phase excursion over said interval;

(d) means for correcting said respective first and second drive voltages in response to said phase error signal, and (e) switch means responsive to a delayed key signal for coupling said phase error signal to either said first or said second voltage drive source in dependence on the value of said key signal, said delayed key signal being delayed in time by an interval T.

5. The modulator of claim 4 wherein said means for deriving a phase error signal comprises means for taking the difference of the measured phase excursion over said keying interval and the ideal phase excursion over said interval.

6. The modulator of claim 5 wherein said binary-valued key signal stream has a value of $+1$ or $-1$, and said means for taking said difference comprises means for providing a value of $-\pi/2$ or $+\pi/2$ for respective values of $+1$ and $-1$ of said key signal, and for adding said value of $-\pi/2$ or $+\pi/2$ to said measured phase excursion value at the end of a particular key interval.

7. The modulator of claim 4 wherein said feedback means further comprises first and second accumulator circuits for accumulating said phase error signals respectively attributable to operation of the modulator at said respective first or second signal frequencies over time, whereby the correction applied to the respective voltage sources is based on an accumulation of said phase error signals over a plurality of key intervals.

8. The modulator of claim 7 wherein said first and second drive voltage sources comprise first and second respective digital-to-analog converter means, and said first and second accumulator circuits provide respective first and second digital accumulator output signals which are converted into said first and second drive voltages by said first and second digital-to-analog converter means.

9. A Minimum-Shift Keying (MSK) modulator receiving a binary-valued key signal stream characterized by a keying interval T and whose values determine whether a first or second signal frequency is generated by said modulator, and comprising:

(a) a voltage controlled oscillator (VCO), the VCO output signal being the modulator output signal, (b) a first drive voltage source;

(c) a second drive voltage source;

(d) first switching means for coupling said first drive voltage or said second drive voltage to said VCO according to the value of said binary-valued key signal stream;

(e) a phase comparator for comparing the phase of the VCO output signal to the phase of a reference signal over the keying interval T to provide a phase error signal; and (f) means for adjusting said first voltage source and said second voltage source based on said phase error signal.

10. A Minimum-Shift Keying (MSK) modulator as recited in claim 9 wherein said first drive voltage source and said second drive voltage source comprise first and second digital to analog converter means, respectively; and said means for adjusting said first voltage source and said second voltage source based on said phase error signal includes first and second accumulator circuits for accumulating said phase error signals respectively attributable to operation of the modulator at said respective first or second signal frequencies over time.

11. A Minimum-Shift Keying (MSK) modulator as recited in claim 9 further including:

second switching means responsive to a delayed key signal for coupling said phase error signal to either said first or said second voltage drive source in dependence on the value of said key signal, said delayed key signal being delayed in time by an interval T.

* * * * *